United States Patent
Vilatela García et al.

(10) Patent No.: US 12,442,105 B2
(45) Date of Patent: Oct. 14, 2025

(54) NANOWIRES NETWORK

(71) Applicant: FUNDACIÓN IMDEA MATERIALES, Getafe (ES)

(72) Inventors: Juan José Vilatela García, Getafe (ES); Richard Santiago Schäufele, Getafe (ES)

(73) Assignee: FUNDACIÓN IMDEA MATERIALES, Madrid (ES)

( * ) Notice: Subject to any disclaimer, the term of this patent is extended or adjusted under 35 U.S.C. 154(b) by 103 days.

(21) Appl. No.: 17/755,937

(22) PCT Filed: Nov. 12, 2020

(86) PCT No.: PCT/EP2020/081963
§ 371 (c)(1),
(2) Date: May 12, 2022

(87) PCT Pub. No.: WO2021/094485
PCT Pub. Date: May 20, 2021

(65) Prior Publication Data
US 2022/0389614 A1 Dec. 8, 2022

(30) Foreign Application Priority Data
Nov. 13, 2019 (EP) .................................... 19382996

(51) Int. Cl.
*C30B 11/12* (2006.01)
*B82Y 40/00* (2011.01)
(Continued)

(52) U.S. Cl.
CPC .............. *C30B 29/62* (2013.01); *B82Y 40/00* (2013.01); *C30B 11/12* (2013.01); *C30B 11/14* (2013.01); *C30B 25/005* (2013.01); *C30B 29/08* (2013.01)

(58) Field of Classification Search
CPC ....... C30B 29/08; C30B 29/62; C30B 25/005; C30B 11/12; C30B 11/14; B82Y 40/00
See application file for complete search history.

(56) References Cited

U.S. PATENT DOCUMENTS

| 2004/0112964 A1* | 6/2004 | Empedocles ....... H01L 29/0673 235/491 |
| 2005/0026662 A1 | 2/2005 | Fechner et al. |

(Continued)

FOREIGN PATENT DOCUMENTS

| CN | 104302816 A * | 1/2015 | ............ B82Y 40/00 |
| WO | 2002051389 A2 | 7/2002 | |

(Continued)

OTHER PUBLICATIONS

Heurlin et al., "Continuous gas-phase synthesis of nanowires with tunable properties", doi:10/1038/nature11652, Nature, vol. 492, 6 pages Dec. 6, 2012.

(Continued)

*Primary Examiner* — Robert M Kunemund
(74) *Attorney, Agent, or Firm* — McKee, Voorhees & Sease, PLC (57) ABSTRACT

The present invention refers to a method for preparing a network of nanowires; to a network of nanowires obtainable by said method; to a nonwoven material comprising the network, to an electrode comprising the network, a pharmaceutical composition 10 comprising the network of nanowires, to the use of the network of nanowires and to the use of the nonwoven material.

19 Claims, 6 Drawing Sheets

(51) Int. Cl.
*C30B 11/14* (2006.01)
*C30B 25/00* (2006.01)
*C30B 29/08* (2006.01)
*C30B 29/62* (2006.01)

(56) References Cited

U.S. PATENT DOCUMENTS

| | | |
|---|---|---|
| 2005/0266662 A1 | 12/2005 | Yi |
| 2008/0280169 A1* | 11/2008 | Niu .................... H01M 4/8657 429/409 |
| 2010/0012921 A1* | 1/2010 | Kawashima ........... B82Y 30/00 257/15 |
| 2010/0065810 A1 | 3/2010 | Goesele et al. |
| 2011/0223484 A1 | 9/2011 | Korgel et al. |
| 2013/0017145 A1* | 1/2013 | Sunkara ................. B01J 19/088 204/157.43 |
| 2013/0022995 A1 | 1/2013 | Park et al. |
| 2013/0098288 A1 | 4/2013 | Samuelson et al. |
| 2014/0345686 A1* | 11/2014 | Heurlin ........... H01L 31/035227 136/256 |
| 2016/0130698 A1* | 5/2016 | Alcott .................... C23C 16/46 118/712 |
| 2018/0019468 A1* | 1/2018 | Zhu .................... H01J 37/3244 |
| 2018/0050734 A1* | 2/2018 | Olsson .................. B62D 43/10 |

FOREIGN PATENT DOCUMENTS

| | | |
|---|---|---|
| WO | 2013176619 A1 | 11/2013 |
| WO | 2016075549 A1 | 5/2016 |

OTHER PUBLICATIONS

Koziol et al., "Carbon and Oxide Nanoestructures", Adv. Struct. Mater 2010, 5, pp. 23-49. Jul. 13, 2010.

Magnusson et al., "Semiconductor nanostructures enabled by aerosol technology", Front. Phys., DOI 10.1007/ s11467-013-0405-x, 21 pages 2014.

Smail et al., "Direct spinning of CNT fibres: Past, present and future scale up", Carbon, vol. 152, pp. 218-232 May 2019.

Zhimin et al., "Flexible and recoverable SiC nanofiber aerogels for elecromagnetic wave absorption", Ceramics International, vol. 45, pp. 22793-22801 Jul. 2019.

International Searching Authority, in connection to PCT/EP2020/081963, filed Nov. 12, 2020, "Written Opinion of the International Searching Authority", 12 pages Dec. 8, 2020.

Catenacci et al. "Stretchable conductive composites from Cu—Ag nanowire felt." ACS nano 12.4 (2018): 1-27.

* cited by examiner

NANOWIRES NETWORK

CROSS REFERENCE TO RELATED APPLICATIONS

This is a U.S. national phase application claiming priority to PCT/EP2020/081963, filed Nov. 12, 2020, which claims priority to application Ser. No. 19/382,996.7, filed Nov. 13, 2019 in the European Patent Office, the entire contents of which are hereby incorporated by reference in their entirety.

FIELD OF THE INVENTION

The present invention relates to the synthesis of a network of nanowires. More specifically, the present invention relates to a process for preparing said network of nanowires.

BACKGROUND

Networks comprised of nanowires present advantages over materials made of larger building blocks. In general, nanowires are mechanically flexible due to their nanoscale dimensions and have a reduced amount of defects in comparison with bulk materials. They also display various optoelectronic properties resulting from their small size and one-dimensional morphology. Consequently, some of the properties of the nanowires networks depend on the characteristics of the nanowires. Thus a high degree of control over the nanowires' crystalline quality, morphology and size distribution is needed.

Heurlin, M. et al. (Heurlin, M. et al. Nature volume 492, pages 90-94, 2012) discloses an aerosol-based nanowire growth method (aerotaxy method) wherein catalytic size-selected Au aerosol particles induce nucleation and growth of GaAs nanowires at a growth rate of about 1 micrometer per second. The effectivity of aerotaxy method has only been demonstrated for the synthesis of GaAs (GaAsNWs), P-, Zn- and Sn-doped GaAsNWs nanowires and InP nanoparticles (Magnusson, M. H. et al. Frontiers of Physics, 9(3), 398-418, 2014). WO2013176619 (A1) describes a gas phase nanowire synthesis method that claims to be able to grow individual silicon nanowires followed by a subsequent step of spraying said nanowires through a spray nozzle followed by their deposition onto a substrate to form a network of nanowires. According to WO2013176619 (A1) the spraying and deposition step may be performed right after the synthesis of nanowires or after the storage of said nanowires in a reservoir. However, two-step methods for synthesis of nanowire networks lead to nanowires shortening and therefore to degraded materials. Moreover, the nanowires forming the network are not permanently entangled or associated and need to be deposited on a supporting substrate to generate self-standing materials.

In summary, there is a need to develop one-step methods for synthesis of networks of nanowires with good mechanical properties that overcome prior art limitations.

BRIEF DESCRIPTION OF THE INVENTION

The inventors of the present invention have found a one-step method for producing self-standing networks of nanowires with good mechanical properties, such as good flexibility in bending, and wherein the nanowires have high aspect ratios. The discovery of self-standing networks of nanowires that are also flexible represents a breakthrough since they allow post-production manipulation of the nanowire network as an engineering material, rather than as a powder or filler which typically undergo degradation and/or nanowire shortening during dispersion upon processing. In addition, the inventors have observed that the method of the present invention allows the production of networks of nanowires in large amounts and at high rates. This approach is of great importance for a large variety of applications of networks of nanowires in various technological fields, since it solves the current limitations of the prior art.

The method of the present invention is based on aerosol technology and has the potential of being scaled up to produce large amounts of product, while maintaining a high level of control over the process.

Thus, in a first aspect, the invention is directed to a method for preparing a network of nanowires comprising the steps of:

i. providing a first gas flow to a reaction vessel;
   wherein said first gas flow comprises at least one precursor compound comprising at least one element selected from Si, Ge, Al, B, Cu, Zn, Cd, Al, Ga, In, As, Sb, Nb, Ni, Ti, Se, Ta, Pt, Mo, W, C, N, O, Co, Mn, Li and Te; and ii. providing a second gas flow to the reaction vessel, said second gas flow comprising metallic catalyst particles; so as the first and second gas flows are mixed in the reaction vessel to form a gas flow mixture;
   wherein the at least one precursor compound is in the gas flow mixture in a mole fraction ($x_i$) of at least 0.005;
   wherein the temperature inside the reaction vessel ranges from 200 to 800° C. or is at least 801° C.; and
   wherein the at least one precursor compound decomposes under the temperature inside the reaction vessel and grows on the metallic catalyst particles by vapor liquid-solid (VLS) and/or chemical vapor deposition (CVD) to form a network of nanowires.

In a second aspect, the invention is directed to a network of nanowires obtainable by the method as defined above; wherein the aspect ratio (length/diameter) of the nanowires of the network of nanowires is at least 130.

In a third aspect, the present invention is directed to a nonwoven material comprising the network of nanowires of the present invention.

Another aspect of the invention is directed to an electrode comprising the network of nanowires of the present invention in any of its particular embodiments or the nonwoven material of the present invention and optionally an electrical connection or a current collector, preferably comprising a conductive wire or a current collector; wherein the electrical connection or the current collector and the network of nanowires are electrically connected.

In a further aspect, the present invention is directed to the use of the network of nanowires of the present invention, in electronic devices, micromechanical systems, optoelectronic devices, wearable devices, insulators, sensors, electrodes, catalysis, structural elements, batteries, flexible devices, radiation absorbing material and transparent devices.

In a further aspect, the present invention is directed to the use of the nonwoven materials of the present invention, in electronic devices, micromechanical systems, optoelectronic devices, wearable devices, insulators, sensors, electrodes, catalysis, structural elements, batteries, flexible devices, radiation absorbing material and transparent devices.

In a further aspect, the present invention is directed to a pharmaceutical composition comprising the network of nanowires of the invention or the nonwoven material of the invention.

DETAILED DESCRIPTION OF THE INVENTION

Unless defined otherwise, all technical and scientific terms used herein have the same meaning as commonly understood to one of ordinary skill in the art to which this disclosure belongs. As used herein, the singular forms "a" "an" and "the" include plural reference unless the context clearly dictates otherwise.

The present invention is directed to a method for preparing a network of nanowires, to the network of nanowires obtainable by said method, to a nonwoven material comprising the network of nanowires, to the uses of the network of nanowires of the invention and the nonwoven material, and to a pharmaceutical composition comprising the network of nanowires of the invention or the nonwoven material of the invention.

The nanowires of the network of nanowires of the present invention are high aspect ratio structures that may be made of a solid material or may be hollow (having a tube shape). In an embodiment, the nanowires are continuous structures (not porous). In another embodiment, the nanowires form a net by joining among each other during their synthesis.

Method

In a first aspect, the invention is directed to a method for preparing a network of nanowires comprising the steps of:
i. providing a first gas flow to a reaction vessel;
  wherein said first gas flow comprises at least one precursor compound comprising at least one element selected from Si, Ge, Al, B, Cu, Zn, Cd, Al, Ga, In, As, Sb, Nb, Ni, Ti, Se, Ta, Pt, Mo, W, C, N, O, Co, Mn, Li, and Te; and
ii. providing a second gas flow to the reaction vessel, said second gas flow comprising metallic catalyst particles; so as the first and second gas flows are mixed in the reaction vessel to form a gas flow mixture;
wherein the at least one precursor compound is in the gas flow mixture in a mole fraction (xi) of at least 0.005;
wherein the temperature inside the reaction vessel ranges from 200 to 800° C. or is at least 801° C.; and
wherein the at least one precursor compound decomposes under the temperature inside the reaction vessel and grows on the metallic catalyst particles by vapor liquid-solid (VLS) and/or chemical vapor deposition (CVD) to form a network of nanowires.

The method for preparing a network of nanowires may comprise a further step of transforming the network of nanowires into fibers, yarns or fabrics. The step of transforming the network of nanowires into fibers, yarns or fabrics is optionally performed at the same time than step (ii) of the method of the invention.

In a particular embodiment, the method for preparing a network of nanowires comprises a further step of collecting the network of nanowires; particularly by spinning and winding the network of nanowires (as a yarn or a fabric) on a bobbin.

In an embodiment, the method of the present invention is a continuous aggregated method.

Step (i)

The method for preparing a network of nanowires of the present invention comprises a step (i) of providing a first gas flow to a reaction vessel; wherein said first gas flow comprises at least one precursor compound comprising at least one element selected from Si, Ge, Al, B, Cu, Zn, Cd, Al, Ga, In, As, Sb, Nb, Ni, Ti, Se, Ta, Pt, Cu, Mo, W, C, N, O, Co, Mn, Li and Te.

In a particular embodiment, the first gas flow further comprises $H_2$. In a particular embodiment, the first gas flow further comprises an inert gas, particularly $N_2$.

Precursor

The step (i) of the method of the present invention provides a first gas flow to a reaction vessel wherein said first gas flow comprises at least one precursor compound. In a particular embodiment, the at least one precursor compound is a compound that participates in a reaction (i.e. chemical reaction) that produces the nanowire network of the present invention, for example, $SiH_4$ is a precursor compound that when used in the method of the present invention may lead to a Si nanowire network.

In a particular embodiment, the at least one precursor compound of the method of the present invention comprises at least one element selected from Si, Ge, Al, B, Cu, Zn, Cd, Al, Ga, In, As, Sb, Nb, Ni, Ti, Se, Ta, Pt, Cu, Mo, W and Te; particularly Si, Ge, In, Ga, Se and Te; more particularly Si and Ge; even more particularly Si.

In a particular embodiment, the at least one precursor compound is one precursor compound.

The at least one precursor compound may be in solid or liquid form (i.e. aerosolized in the first gas flow of the method of the present invention) or in gas form. In a particular embodiment, the at least one precursor compound is in gas form.

In a particular embodiment, the at least one precursor compound of the method of the present invention is a metallic hydride or an organometallic compound. Precursors of the present invention include but are not limited compounds such as (3-Aminopropyl)triethoxysilane, N-sec-Butyl(trimethylsilyl)amine, chloropentamethyldisilane, tetramethylsilane, silicon tetrabromide, silicon tetrachloride, tris(tert-butoxy)silanol, $SiH_4$, tetramethylgermanium, triethylgermanium hydride, triphenylgermanium hydride, triphenylgermanium hydride, tetramethylgermanium, tributylgermanium hydride, triethylgermanium hydride, trimethylgermanium hydride, trimethylindium (TMin), triethylindium (TEIN), trimethylgallium (TMG), triethylgallium (TEG), dimethyl selenide, tellurium tetrachloride, trimethylaluminium (TMAI), triethylaluminium (TEAI), $NH_3$, $AsH_3$ and $PH_3$; particularly silane derivates such as (3-Aminopropyl)triethoxysilane, N-sec-Butyl(trimethylsilyl)amine, chloropentamethyldisilane, tetramethylsilane, silicon tetrabromide, silicon tetrachloride, tris(tert-butoxy) silanol, $SiH_4$, tetramethylgermanium, triethylgermanium hydride, triphenylgermanium hydride, triphenylgermanium hydride, tetramethylgermanium, tributylgermanium hydride, triethylgermanium hydride, triphenylgermanium hydride, trimethylindium (TMin), trimethylindium (TEIN), trimethylgallium (TMG), triethylgallium (TEG), dimethyl selenide and tellurium tetrachloride; more particularly silane derivates such as (3-Aminopropyl)triethoxysilane, N-sec-Butyl(trimethylsilyl)amine, chloropentamethyldisilane, tetramethylsilane, silicon tetrabromide, silicon tetrachloride, tris(tert-butoxy)silanol, $SiH_4$, tetramethylgermanium, triethylgermanium hydride, triphenylgermanium hydride, triphenylgermanium hydride, tetramethylgermanium, tributylgermanium hydride, triethylgermanium hydride and triphenylgermanium hydride; even more particularly $SiH_4$.

In a particular embodiment, the at least one precursor compound is a metallic hydride, particularly $SiH_4$.

In a particular embodiment, the at least one precursor compound is an organometallic compound.

In a particular embodiment, the first gas flow comprises more than one precursor compound. In particular, the first gas flow comprises a first precursor compound and additional precursor compounds. In a particular embodiment, the additional precursor compounds may be used as dopants of the nanowire network (in less amount that the main precursor compound). Suitable dopants depend on the nanowire material being doped.

In a particular embodiment, the at least one precursor compound of the present invention is provided to the reaction vessel of the present invention at a rate of at least 0.01 mol/h; preferably at a rate of at least 0.05 mol/h; more preferably of at least 0.10 mol/h; even much more preferably of about 0.03 mol/h.

Step (ii)

The method for preparing a network of nanowires of the present invention comprises a step (ii) of providing a second gas flow to the reaction vessel, said second glass flow comprising metallic catalyst particles; so as the first and second gas flows are mixed in the reaction vessel to form a gas flow mixture.

In a particular embodiment, the second gas flow of the method of the present invention further comprises an inert gas, preferably $N_2$.

In a more particular embodiment, the second gas flow of the method of the present invention further comprises $H_2$.

In a particular embodiment only one type of gas is used in the invention. In particular, the terms "first" and "second" are referred to the number of flows used.

Catalyst

The method for preparing a network of nanowires of the present invention comprises a step (ii) of providing a second gas flow comprising metallic catalyst particles.

In a particular embodiment, the metallic catalyst particles of the method of the present invention comprise one or more element selected from Au, Ag, Cu, Fe, Ni, Ga, Co, Pt, In and Al; particularly comprise one or more element selected from Au, Ni, Ag and Cu; more particularly comprise one or more element selected from Au and Ag; even more particularly comprise Au. The metallic catalytic particles may consist of a single element, or a combination (e.g. alloy) of two or more elements. The metallic catalyst particles may be in the second gas flow as solid particles or as liquid particles; preferably as solid particles.

In another particular embodiment, the metallic catalyst particles of the method of the present invention further comprise one or more additional elements selected from group 16 elements to control and/or enhance the growth of nanowires. This additional elements are particularly selected from oxygen, sulfur, selenium, tellurium, and polonium; more particularly selected from S, Se, Te and 0.

In a particular embodiment, the metallic catalyst particles consist of one element selected from Au, Ag, Cu, Fe, Ni, Ga, Co, Pt, In and Al; particularly consist of one element selected from Au, Ag and Cu; more particularly consist of one element selected from Au and Ag; even more particularly consist of Au.

In a particular embodiment, the metallic catalyst particles have an averaged diameter of between 0.1 and 100 nm; preferably of between 1 and 30 nm. The average diameters of the metallic catalyst particles of the present invention may be calculated from an average of the values obtained by measuring the diameters of more than 100 metallic catalyst particles using electronic microscopy micrographs or from the size distribution obtained from different aerosol measuring technics such as from a Differential Mobility Particle Sizer (DMA).

Furthermore, the metallic catalyst particles may be provided without electrical charge or the metallic catalytic particles may be given a charge.

The metallic catalyst particles may be provided to the reaction vessel in the form of an aerosol generated by an upstream aerosol generator. Alternatively, the metallic catalyst particles may be formed in-situ by providing a precursor compound; preferably a gaseous precursor compound. In a preferred embodiment, the metallic catalyst particles are provided in the form of an aerosol.

In a particular embodiment, the metallic catalyst particles enter the reaction vessel at a rate of at least $1 \times 10^{-5}$ g/h; preferably of at least $1 \times 10^{-4}$ g/h; more preferably of at least $2 \times 10^{-4}$ g/h; even more preferably of at least $2.7 \times 10^{-4}$ g/h.

Gas Flow Mixture

In a particular embodiment the gas flow mixture of the method of the present invention is generated when the first and the second gas flow are in contact in the reaction vessel. Means for mixture may be used to mix the flows to form a gas flow mixture. Pressure and flow rates might be adjusted if necessary to ensure a proper mixture of the first and second flow to form a gas flow mixture.

In a particular embodiment, the gas flow mixture circulates in the reaction vessel at a rate of at least 60 l/h; preferably at least 120 l/h.

In another particular embodiment, the gas flow mixture has a residence time in the reaction vessel of less than 100 seconds; particularly of between 0.1 and 80 seconds; more particularly of between 1 and 60 seconds; even more particularly of between 2 and 30 seconds; preferably of between 4 and 16 seconds.

In addition to the gas flow mixture, one or more sheath flows may be introduced in the reaction vessel of the present invention. Sheath flows include, but are not limited to, nitrogen, hydrogen and noble gases such as helium and argon.

In the method of the present invention the at least one precursor compound is in the gas flow mixture in a mole fraction (xi) of at least 0.005.

In a particular embodiment, the at least one precursor compound is in the gas flow mixture in a mole fraction of at least 0.006; particularly of at least 0.01; more particularly of at least 0.015; even more particularly of between 0.01 and 0.5; preferably of about 0.02. In the context of the present invention, the mole fraction is expressed as the amount of a constituent (in moles), divided by the total amount of all constituents (also expressed in moles).

In a particular embodiment, the at least one precursor compound of the present invention is in the gas flow mixture in a concentration of at least $0.1{\cdot}10^{-4}$ mol/l; particularly in a concentration of at least $1{\cdot}10^{-4}$ mol/l; more particularly in a concentration of at least $1.5*10^{-4}$ mol/l; even more particularly of at least $2*10^{-4}$ mol/l.

In a particular embodiment, the gas flow mixture comprises $H_2$.

In an embodiment, the gas flow mixture of the invention comprises:
- at least one precursor compound;
- at least a sheath gas such as nitrogen, hydrogen and/or noble gases; and
- metallic catalyst particles.

In an embodiment, the gas flow mixture of the invention consist of:
- at least one precursor compound;
- at least a sheath gas such as nitrogen, hydrogen and/or noble gases; and
- metallic catalyst particles.

In a preferred embodiment, the gas flow mixture of the invention consist of:
- a precursor compound such as $SiH_4$;
- a sheath gas or gas mixture such as nitrogen, hydrogen, noble gases of combinations thereof; and metallic catalyst particles such as gold particles.

Reaction Vessel

In a particular embodiment, the reaction vessel used in the process of the present invention is a gas reaction vessel; preferably a cylindrical reaction vessel; more preferably a ceramic or metallic cylindrical reaction vessel; even more preferably a stainless steel cylindrical reaction vessel such as a tube.

According to the method of the present invention, the first and second gas flows mix inside the reaction vessel.

In a particular embodiment, the temperature inside the reaction vessel is homogeneous; in particular is homogeneous within 50 degrees along the reactor tube, more particularly is homogeneous over 80 cm from the hot zone; particularly between 30-50 cm of the hot zone.

In the method of the present invention, the temperature inside the reaction vessel is at least 200° C.; preferably at least 400° C.; more preferably at least 500° C.

In a particular embodiment, the temperature inside the reaction vessel ranges from 200 to 800° C. or is at least 801° C.; this temperatures allow the precursor compound to decompose; preferably the temperature ranges from 200 to 800° C. or from 801 to 3000° C.; more preferably the temperature ranges from 300 to 800° C. or from 801 to 2000° C.

In a particular embodiment, the temperature inside the reaction vessel ranges from 200 to 800° C.; preferably the temperature ranges from 300 to 700° C.; more preferably from 400 to 650° C.; even more preferably is about 600° C.

In a particular embodiment, the pressure inside the reaction vessel is between 500 mbar to 20000 mbar (50000 Pa to 2000000 Pa); preferably between 900 mbar to 3000 mbar (90000 Pa to 300000 Pa).

In a particular embodiment, the temperature inside the reaction vessel is reached by any suitable means of heating known in the art; preferably by plasma, arc discharge, resistive heating, hot wire heating, torch heating, or flame heating means; more preferably by resistive heating, hot wire heating, torch heating, or flame heating means.

Nanowire Network Growth

In the method of the present invention, the at least one precursor compound decomposes under the temperature conditions inside the reaction vessel and grows on the metallic catalyst particles by vapor liquid-solid (VLS) and/or chemical vapor deposition (CVD) to form a network of nanowires. In a particular embodiment the nanowires grow while being in the gas flow mixture (i.e. they are aerosolized). In a particular embodiment, the at least one precursor compound decomposes under the temperature conditions inside the reaction vessel and grows on the metallic catalyst particles by floating catalyst chemical vapor deposition (CVD) to form a network of nanowires.

If necessary, one or more sheath flows may be introduced in the reaction vessel. In particular, said one or more sheath flows might be introduced between the gas flow mixture and the walls of the reaction vessel.

By choosing appropriate precursor compounds, gas flows, temperatures, pressures, and metallic catalyst particles, the nanowires can be grown in the axial or radial direction, or in a combination of the two growth modes; preferably growth occurs in axial direction; more preferably growth occurs in the 110 direction; particularly for Si nanowires.

Nanowire growth may be initiated by catalytic decomposition of the at least one precursor compound on the surface of the metallic catalyst particles and nucleation of the nanowire on the surface of the metallic catalytic particles. After nucleation, the nanowire may grow directionally and form an elongated object, i.e. a nanowire. Growth may occur via vapor liquid-solid (VLS) and/or chemical vapor deposition (CVD). At the same time, the nanowires reach a critical concentration and aggregate to form a network of nanowires in the reaction vessel. Thus, the method of the present invention is a continuous aggregated method. Preferably, the gas mixture flows through the reactor carrying metallic catalytic particles and the nanowire network flows through the reaction vessel length. In an embodiment, the network of nanowires comprises hollow nanowires such as nanotubes. In an embodiment the network of nanowires comprises hollow and not hollow nanowires such as solid nanowires. In another embodiment, the network of nanowires consist of hollow nanowires such as nanotubes.

In the context of the present invention, the expression chemical vapor deposition (CVD) is understood as a process in which one or more volatile precursor compounds react and/or decompose on a catalyst surface to produce one-dimensional structures, such as nanowires. Said catalyst particle may be suspended in the gas phase, commonly referred to as floating catalyst. Said particles may be in molten or solid state and may include additional elements to control and/or enhance growth of nanowires as described herein above. This additional elements include group 16 elements, such as S, Se, Te, or oxygen. Said precursors may also partially decompose on the surface of the reactor.

In a particular embodiment, the method for preparing a network of nanowires of the present invention is performed under an aerogelation parameter of at least $1*10^{-7}$; particularly under an aerogelation parameter of at least $1*10^{-6}$; more particularly under an aerogelation parameter of at least $2*10^{-6}$.

In the context of the present invention, the expression "aerogelation parameter" is understood as the product of the average aspect ratio of the nanowires (length/diameter) and the volumetric concentration (vc (volume of nanowires/volume of the reactor)).

In the context of the present invention, the expression "vapor—liquid—solid" (VLS) is a mechanism for the growth of one-dimensional structures, such as nanowires, from chemical vapor deposition by direct adsorption of a gas (i.e. the at least one precursor compound on gas phase) on to a liquid catalyst particle, which can rapidly adsorb a vapor to supersaturation levels, and from which crystal growth can occur from nucleated seeds at the gas-liquid-solid interface.

In a particular embodiment, a nanowire network of the present invention is formed while being in the gas flow mixture (in the reaction vessel), particularly, a network of nanowires wherein the nanowires are aggregated (i.e. the nanowires are joined, entangled, connected or fused among them) is obtained at the exit of the reaction vessel of the present invention.

In a particular embodiment, the network of nanowires of the present invention is generated as a continuous process. Alternatively, the network of nanowires may be discretely generated. In a preferred embodiment, the network of nanowires of the present invention is continuously generated.

In a particular embodiment, the method of the present invention further comprises a step of collecting the network of nanowires on a substrate; preferably wherein the substrate is a filter; more preferably a vacuum filter. In a more particular embodiment, the method of the present invention further comprises a step of densification of the network of nanowires; preferably by using a solvent or a mixture of solvents; more preferably an organic solvent or a mixture of organic solvents; even more preferably a solvent or a mixture of solvents comprising an alcohol group; even much more preferably using isopropanol.

In a particular embodiment, the network of nanowires of the present invention is generated at a rate of at least 0.01 g/h; preferably at a rate of at least 0.02 g/h; more preferably at a rate of at least 0.05 g/h; even more preferably at a rate of about 0.1 g/h. In another particular embodiment, the network of nanowires of the present invention is generated at a rate of between 0.01 g/h and 10 g/h; preferably at a rate of between 0.02 g/h and 5 g/h; more preferably at a rate of between 0.05 g/h and 1 g/h; even more preferably at a rate of at between 0.09 g/h and 1 g/h.

Network of Nanowires

An aspect of the present invention is directed to a network of nanowires obtainable by the method of the present invention in any of its particular embodiments; wherein the aspect ratio (length/diameter) of the nanowires of the network of nanowires is at least 130.

In a particular embodiment, the nanowires of the network of nanowires of the present invention form a net; preferably the nanowires of the network of nanowires are joined, entangled, connected, fused or interlocked among them; preferably joined, entangled, connected or fused; more preferably joints are formed among them. In an embodiment, the net comprises aggregates of nanowires. In a particular embodiment the net is self-standing.

In a particular embodiment, the network of nanowires is self-standing. In the context of the present invention the term "self-standing" refers to a structure that is not supported by other objects or structures, such as a substrate. In an embodiment, the network of nanowires does not comprise an additional phase such as an additional matrix or binder. In an alternative embodiment, the network of nanowires consist in nanowires.

In a particular embodiment, the nanowires of the network of the present invention are aggregated; particularly are strongly aggregated; particularly they are strongly aggregated by secondary forces such as van der Waals forces, permanent dipoles, hydrogen bonds and/or covalent bonds, entanglements and other forms of mechanical interlock. By strongly aggregated, in the context of the present invention it is implied that the materials form a solid object and that the nanowires that comprise the network cannot be easily dispersed without recourse to sonication, stirring, cutting or similar methods.

In a particular embodiment, the network of nanowires of the present invention is a continuous network. In the context of the present invention, a continuous network is understood as a percolated non-discreet network.

In a particular embodiment, the network of nanowires of the present invention is an aerogel, i.e. a solid material of low density; preferably of a density of below $10^{-2}$ g/cm$^3$; preferably of below $10^{-3}$ g/cm$^3$; more preferably of below $10^{-4}$ g/cm$^3$; more preferably of below $10^{-5}$ g/cm$^3$. In a particular embodiment, the network of nanowires of the present invention has a density of at least 0.001 g/cm$^3$; particularly of at least 0.01 g/cm$^3$.

In a more particular embodiment, the network of nanowires of the present invention is densified; particularly by mechanical methods, solvents addition methods, electromagnetic methods or similar methods.

In a particular embodiment, the nanowires of the network of the present invention have an average aspect ratio (length/diameter) of at least 10; preferably of at least 100; more preferably of at least 110; more preferably of at least 120, even more preferably at least 130; even more preferably of at least 135; even more preferably of at least 140; more preferably of at least 150; even more preferably of at least 200.

In a more particular embodiment, the nanowires of the network of the present invention have an average aspect ratio (length/diameter) of between 1 and 1000; particularly of between 100 and 800; more particularly of between 120 and 700. The average aspect ratio of the nanowires of the network of the present invention may be calculated from an average of the values obtained by measuring the dimensions of a significant number of nanowires (for example, more than 100) using electron microscopy.

In a particular embodiment, the average length of the nanowires of the network of the present invention is at least 1 micron; particularly at least 2 microns; preferably at least 3, 4 or 5 microns; more preferably at least 10 microns. In a particular embodiment, the average length of the nanowires of the network of the present invention is between 1 and 30 microns; preferably between 2 and 20 microns; more preferably between 3 and 15 microns. The average length of the nanowires of the network of the present invention may be calculated from an average of the values obtained by measuring the lengths of more than 100 nanowires using electron microscopy.

In a particular embodiment, the network of nanowires of the present invention has a porosity below 99.9%; particularly below 99%; more particularly below 97%; even more particularly about 96%.

In another particular embodiment, the network of nanowires of the present invention has a porosity below 90.0%.

In an alternative embodiment, the network of nanowires of the present invention has a porosity of between 99.9% and 30%; particularly of between 50% and 98%; more particularly of between 60% and 97%; even more particularly of about 96%.

The porosity of the network of nanowires has been measured using methods known in the art, such as determining the volume of a regular sample by optical and/or electron microscopy observation and measuring its weight gravimetrically; porosity is then calculated through comparison with the theoretical density of a monolithic crystal of the same substance as the nanowire as known in the art.

In a particular embodiment, the nanowires of the network of nanowires of the present invention comprises at least one material selected from GaAs, InP, GaP, $Ga_xIn_{1-x}As_yP_{1-y}$, $Al_xGa_{1-x}As_yP_{1-y}$, GaSb, $Ga_xIn_{1-x}As_ySb_{1-y}$, GaN, InN, AlN, $Al_zGa_xIn_{1-x-z}N$, Si, SiC, Ge or $Si_xGe_{1-x}$, $SiO_x$, $TiO_x$, $ZnO_x$, CdS, $Ta_x$, $MoS_y$, $WS_y$, $MoTe_y$, $TaSe_y$, $NbSe_y$, $NiTe_y$, BN, $Bi_zTe_y$, BP, Cu, Pt, $COO_x$, $MnO_x$, $CuO_x$, $Li_xMn_yO$, $Li_xNi_yMn_zO$ and $Ni_x$ where $0\leq x \geq 1$, $0\leq y \geq 1$ and $0\leq z \geq 1$; preferably comprise Si, SiC, Ge or $Si_xGe_{1-x}$ and $SiO_x$ where $0\leq x \geq 1$; even more preferably comprises Si, Ge or $Si_xGe_{1-x}$ and $SiO_x$ where $0\leq x \geq 1$; more preferably comprise Si or Ge; even more preferably comprises Si. In a particular embodiment, the nanowires of the network of nanowires of the present invention further comprise a coating; preferably an inorganic or carbon coating.

In another particular embodiment, the nanowires of the network of nanowires of the present invention consist of at least one material selected from GaAs, InP, GaP, $Ga_xIn_{1-x}As_yP_{1-y}$, $Al_xGa_{1-x}As_yP_{1-y}$, GaSb, $Ga_xIn_{1-x}As_ySb_{1-y}$, GaN, InN, AlN, $Al_zGa_xIn_{1-x-z}N$, Si, SiC, Ge or $Si_xGe_{1-x}$, $SiO_x$, $TiO_x$, $ZnO_x$, CdS, $Ta_x$, $MoS_y$, $WS_y$, $MoTe_y$, $TaSe_y$, $NbSe_y$, $NiTe_y$, BN, $Bi_zTe_y$, BP, Cu, Pt, $COO_x$, $MnO_x$, $CuO_x$, $Li_xMn_yO$, $Li_xNi_yMn_zO$ and $Ni_x$ where $0\leq x \geq 1$, $0\leq y \geq 1$ and $0\leq z \geq 1$; preferably comprises Si, SiC, Ge or $Si_xGe_{1-x}$ and $SiO_x$ where $0\leq x \geq 1$; more preferably consist of at least one material selected from Si and Ge; even more preferably consist of Si. In another particular embodiment, the nanowires of the network of nanowires of the present invention consist of at least one material selected from Si and Ge and a coating; preferably an inorganic or carbon material.

In a particular embodiment, the network of nanowires of the present invention has a volumetric density of at least 0.01 g/cm³; particularly of at least 0.05 g/cm³; more particularly of at least 0.075 g/cm³; even more particularly of at least 0.080 g/cm³ preferably of at least 0.015 g/cm³; more preferably of at least 0.020 g/cm³; even more preferably about 0.128 g/cm³.

In a particular embodiment, the network of nanowires of the present invention has a volumetric density of between 0.01 g/cm³ and 0.2 g/cm³; particularly between 0.07 g/cm³ and 0.30 g/cm³. The volumetric density of the network of nanowires of the invention may be calculated from any experimental technique known in the art, particularly it determined from areal density and thickness of the sample of the network of nanowires.

In a particular embodiment, the nanowires of the network of nanowires of the present invention are entangled; preferably are physically entangled.

In a particular embodiment, the network of nanowires of the present invention is a network that comprises nanowires. In a particular embodiment, the nanowires forming the network can have the same or different properties. In a more particular embodiment, the nanowires comprised in the network have different composition and/or aspect ratios.

In a particular embodiment, the nanowires of the network of nanowires are hollow (i.e. they are nanotubes); preferably they are nanotubes. In a more particular embodiment, the hollow nanowires comprise Si, SiC, Ge or $Si_xGe_{1-x}$ and $SiO_x$ where $0\leq x \geq 1$; more preferably consist of at least one material selected from Si and Ge; even more preferably consist of Si.

In a particular embodiment, the network of nanowires of the present invention further comprise the metallic catalyst particles used in the method of the present invention.

In a particular embodiment, the nanowires of the network of nanowires of the present invention further comprise coatings; particularly inorganic or carbon coatings; more preferably carbon coatings.

In a particular embodiment, the network of nanowires of the present invention further comprises coatings; particularly inorganic or carbon coatings; more preferably carbon coatings.

In another particular embodiment, the network of nanowires of the present invention can be chemically functionalized by gas-phase, liquid-phase, annealing or irradiation processes. In a particular embodiment, the chemical functionalization of the nanowires is performed in the synthesis process or in an additional step.

In a particular embodiment, the nanowires of the network of nanowires of the present invention further comprise a labeling or marking element or compound; wherein said labeling element or compound allow their traceability. In a particular embodiment, the labeling or marking of the nanowires is performed during the synthesis process or after said synthesis, in an additional step.

In a particular embodiment, the nanowires of the network of nanowires of the present invention are predominantly aligned.

In a particular embodiment, the network of nanowires of the present invention are drawn, stretched or subjected to electromagnetic or electrochemical methods to align the nanowires.

In a particular embodiment, the network of nanowires of the present invention further comprise particles; preferably amorphous particles; more preferably amorphous spherical particles.

In a particular embodiment, the network of nanowires of the present invention are crystalline.

In an embodiment, the network of nanowires of the present invention comprise a crystalline phase and an amorphous phase; preferably, wherein the crystalline phase is in at least a 50 wt % of the total weight of the network; more preferably in at least a 75 wt %; even more preferably in at least a 90 wt %; even more preferably wherein the crystalline phase comprises crystalline nanowires and the amorphous phase comprises amorphous particles; preferably amorphous spherical particles.

In an embodiment, the network of nanowires of the present invention comprise at least a 50 wt % of crystalline nanowires of the total weight of the network; preferably at least a 75 wt %; more preferably at least a 90 wt %.

In another particular embodiment, the network of nanowires of the present invention consist of nanowires.

In an embodiment, the network of nanowires of the present invention has fracture energy values of at least 0.05 J/g; preferably of between 0.1 and 0.5 J/g. Fracture energy values have been measured by mechanical tensile tests of network of nanowire samples using conventional mechanical testing equipment as known in the art.

In an embodiment, the network of nanowires of the present invention has specific tensile strengths over 0.5 MPa/SG; preferably over 0.8 MPa/SG more preferably over 1 MPa/SG. In particular, specific tensile strengths values are in MPa/SG units, wherein SG stands for specific gravity being numerically equivalent to the density of the network of nanowires in units of g/cm³. Specific tensile strengths may be measured by any tensile test technique known in the art, for example may be measured by mechanical tensile measurements of samples of network of nanowires using a Textechno Favimat tensile tester at a strain rate of 10%/min and preferably at a gauge length of 5 mm.

Nonwoven Material

Another aspect of the present invention is directed to a nonwoven material comprising the network of nanowires as defined in any of its particular embodiments. In a particular embodiment, the nonwoven material of the present invention comprises one or more layers of the network of nanowires of the present invention.

In another particular embodiment, the nonwoven material of the present invention is a nonwoven fabric; preferably a unidirectional nonwoven fabric.

In another particular embodiment, the nanowires of the network of nanowires of the nonwoven material of the present invention are oriented in a single direction; preferably in a single parallel direction.

In another particular embodiment, the nonwoven material of the present invention is nonwoven fabric wherein the nanowires of the network of nanowires are oriented in a single direction; preferably in a single parallel direction.

In another particular embodiment, the nonwoven material of the present invention is a yarn.

In another particular embodiment, the nonwoven material of the present invention can be chemically functionalized by gas-phase, liquid-phase, annealing or irradiation processes that modify the surface chemistry of the nanowires.

Uses

Another aspect of the present invention is directed to the use of the network of nanowires of the present invention in electronic devices, micromechanical systems, optoelectronic devices, wearable devices, insulators, sensors, electrodes, catalysis, structural elements, batteries, flexible devices, radiation absorbing material and transparent devices.

Another aspect of the present invention is directed to the use of the nonwoven material of the present invention in electronic devices, micromechanical systems, optoelectronic devices, wearable devices, insulators, sensors, electrodes, catalysis, structural elements, batteries, flexible devices, radiation absorbing material and transparent devices.

In an embodiment, the present invention is directed to the use of the network of nanowires of the invention or the nonwoven material of the invention, in batteries, particularly in an electrode such as an anode or a cathode, a separator and/or a current collector of batteries.

In an embodiment, the present invention is directed to the use of the network of nanowires of the invention or the nonwoven material of the invention as electrode; preferably as an anode in a lithium battery.

Electrode:

Another aspect of the invention is directed to an electrode comprising the network of nanowires of the present invention in any of its particular embodiments or the nonwoven material of the present invention and optionally an electrical connection or a current collector, preferably comprising a conductive wire or a current collector; wherein the electrical connection and the network of nanowires are electrically connected. In an embodiment, the electrode consist of the network of nanowires of the present invention. In a more particular embodiment, the electrode is an anode.

The authors of the present invention have observed that the mechanical properties endowed by the nanowire network eliminate the use of reinforcing additives (e.g. polymeric binders) in the electrode and enable methods to process or integrate such electrode without the need for solvents or other forms of dispersion traditionally used.

Pharmaceutical Composition

An aspect of the invention is directed to a pharmaceutical composition comprising the network of nanowires according to any of claims 10-16 or the nonwoven material according to claim 17; preferably as pharmaceutically acceptable excipients.

EXAMPLES

The invention is illustrated by means of the following example that in no case limits the scope of the invention.

Example 1

A network of nanowires comprising silicon (Si) nanowires was produced by decomposition of a Si precursor in the presence of catalyst nanoparticles suspended in a gas stream inside a reaction vessel.

A first gas flow delivered a $SiH_4$ precursor (2 g/h) in a flow of $H_2$ (200 specific cubic centimeters per minute) to a reaction vessel. At the same time, an aerosol of pre-synthesized catalyst gold nanoparticles in a $N_2$ flow as main carrier gas (1 specific liters per minute) was introduced into the reaction vessel as a second gas flow. Then, the first and second flows mixed to form a gas flow mixture.

The $SiH_4$ precursor was in the gas flow mixture in a mole fraction of 0.02 (expressed as the amount of the precursor in moles, divided by the total amount of all constituents in the mixture also expressed in moles), and in a concentration of $2.4*10^{-4}$ mol/l in the reaction vessel. The reaction vessel used was a metallic reaction tube inside a tube furnace.

Upon entry of the gas flow mixture into the hot zone of the reaction vessel (at around 600° C.), the Si precursor decomposed and associated with the catalyst particles. Si nanowires grew rapidly inside the reaction vessel, also suspended in the gas stream. The average length of the nanowires was at least 4 microns. Nanowires average diameter and aspect ratio were obtained from a significant number of measurements performed by image analysis of scanning electron micrographs at high magnification. Nanowire lengths were calculated from the product of diameter and aspect ratio.

Figure 1:
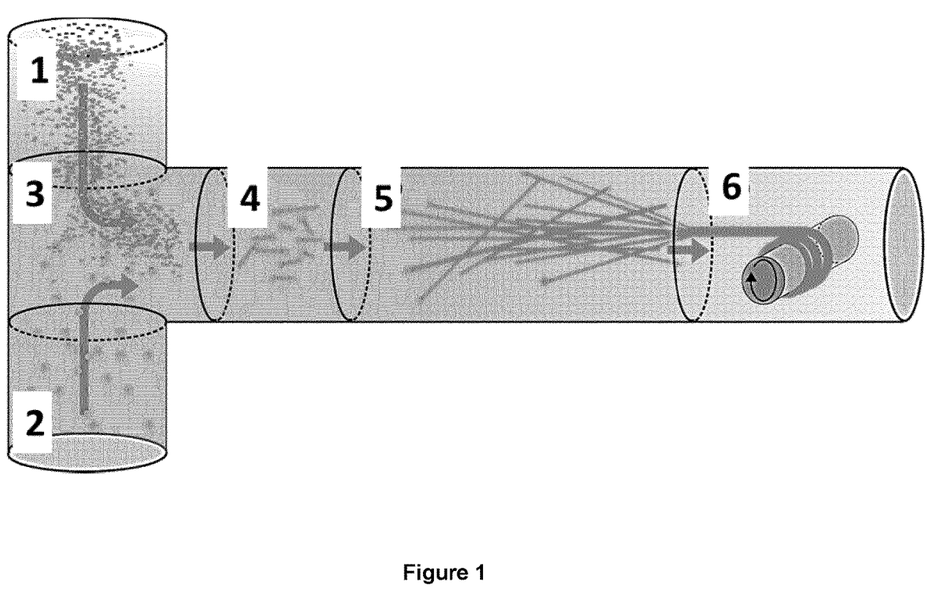
FIG. 1 shows a sketch of the continuous synthesis system comprising (1) a silicon precursor flow entry, (2) an aerosol of catalyst nanoparticles flow entry, (3) a mixing area of the silicon precursor and the catalyst flow; (4) a silicon nanowire nucleation area; (5) area of elongation/growth and entanglement of silicon nanowires; and (6) area of spinning, drawing and/or collection of nonwoven materials (such as fibers) comprising silicon nanowires.
Figure 2:
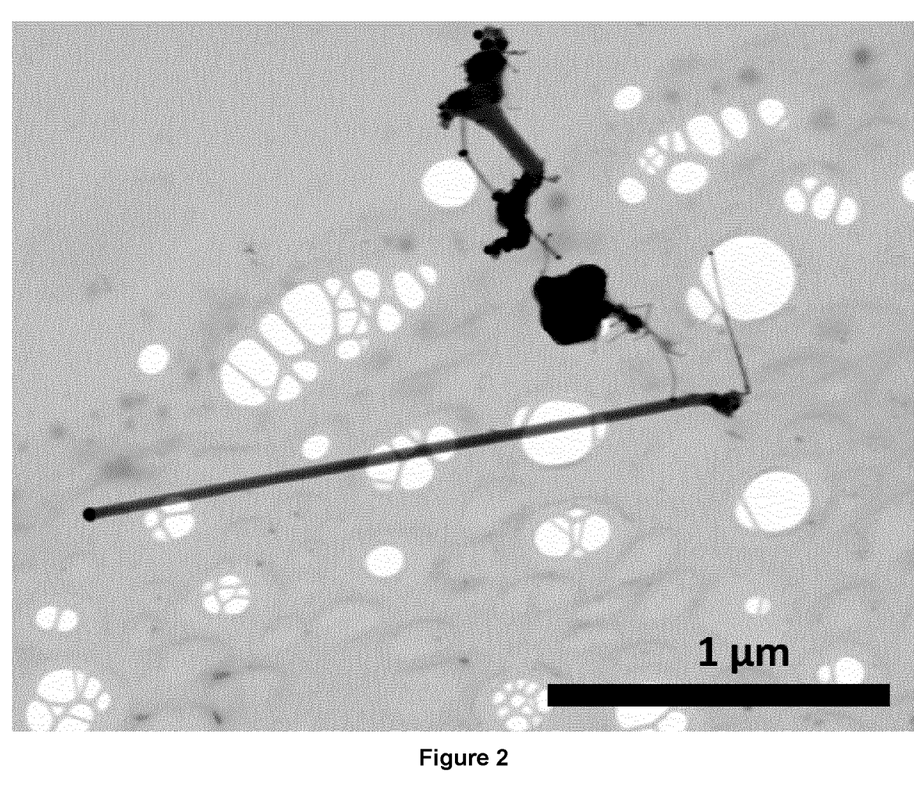
FIG. 2 shows a transmission electron microscopy micrograph showing a silicon nanowire.
Figure 3:
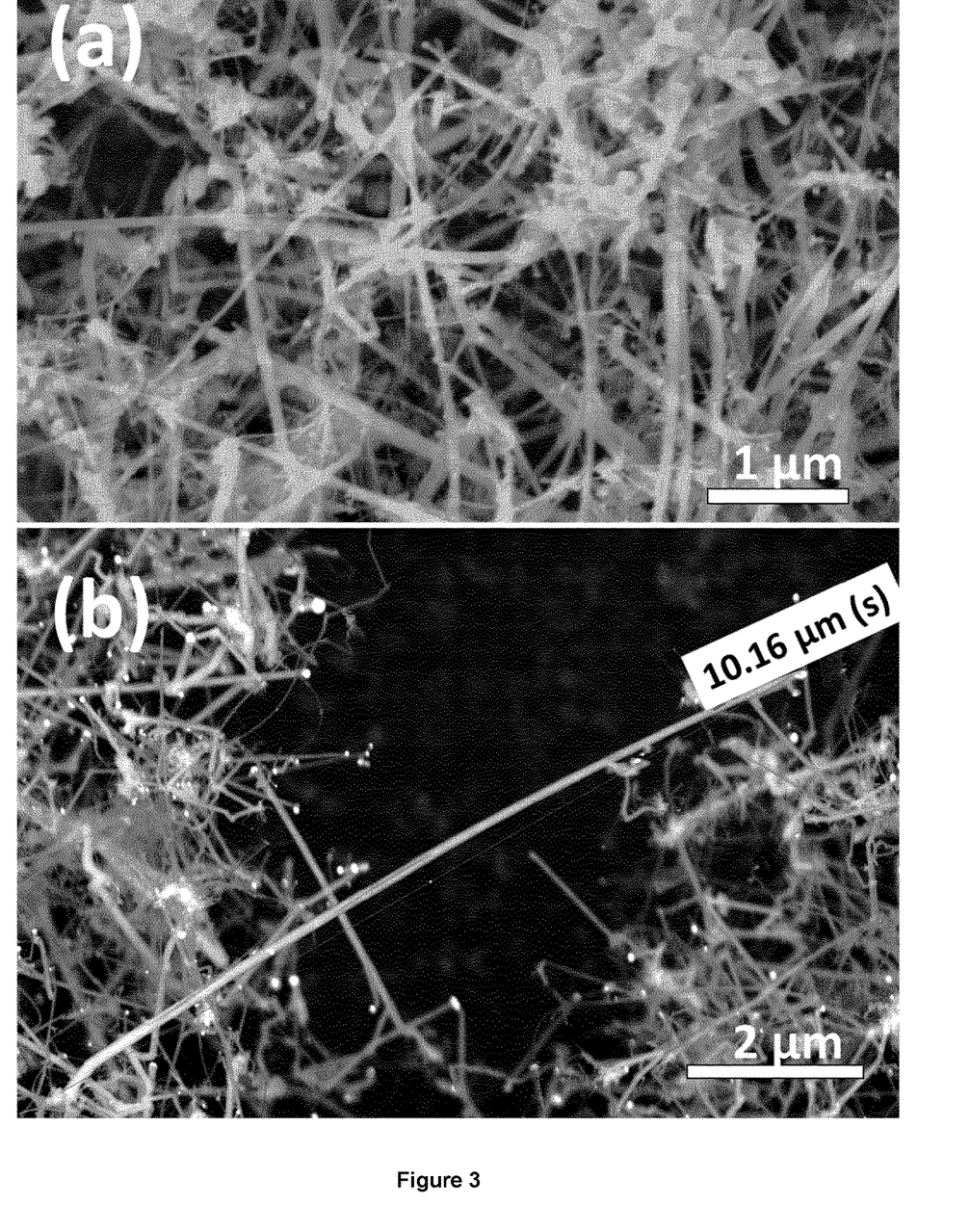
FIG. 3 shows scanning electron microscopy micrographs of the network of silicon nanowires obtained in the present invention.

The nanowires entangled and interact among them in the reaction vessel, and formed a highly porous solid (network of nanowires), similar to a web or an aerogel (see FIG. 3), associated through strong surface interactions among said nanowires. The residence time in the reaction zone was less than 40 seconds. The network material synthesized was collected by drawing it as a yarn or unidirectional nonwoven fabric.

Figure 4:
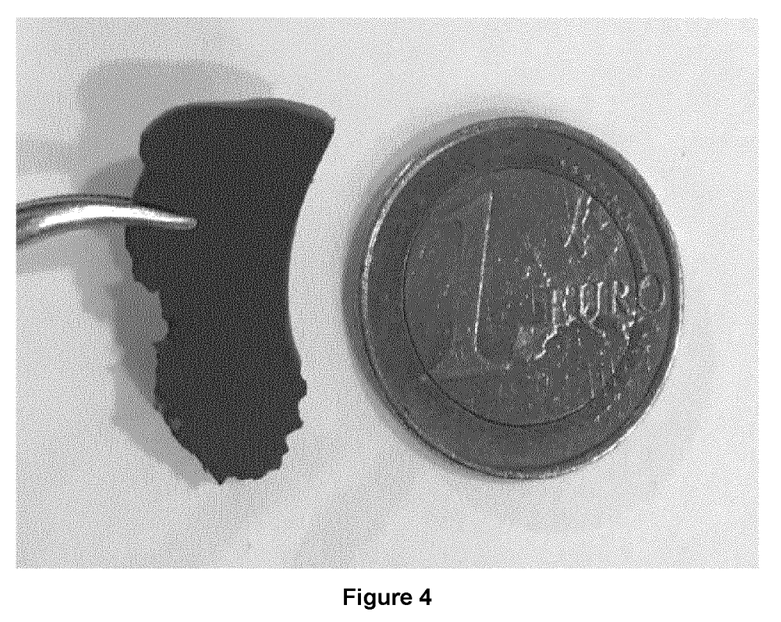
FIG. 4 shows a self-standing network of silicon nanowires obtained in the present invention.
Figure 5:
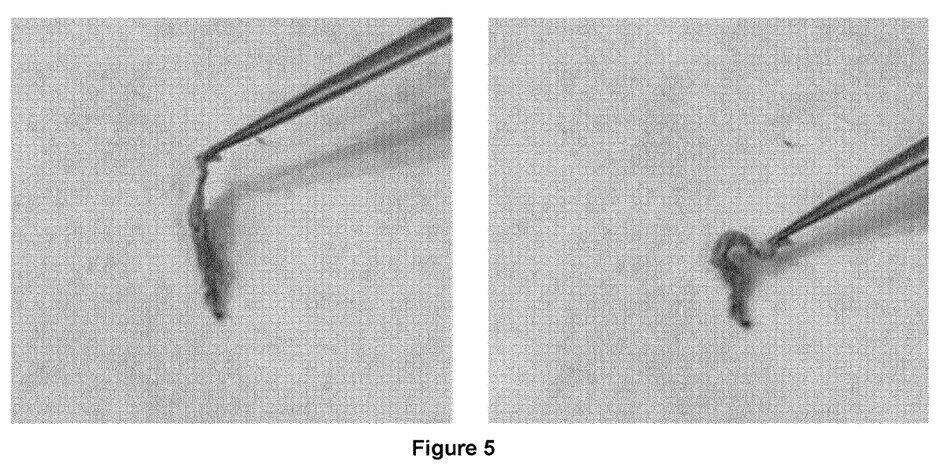
FIG. 5 shows a piece of the network of silicon nanowires obtained in the present invention under bending deformation.

The network of nanowires material synthesized was free-standing (see FIG. 4) and had sufficient mechanical stability to withstand handling under conditions relevant for further processing. As shown in FIG. 5, the obtained material was flexible enough to withstand a reversible bending to a curvature radius of a couple of milimetres (see FIG. 5). The network of nanowires presented a low volumetric density of 0.09 g/cm³ and a porosity of about 96.0%. In addition, the network of nanowires was produced at a rate over $>1\times10^{-1}$ g/h.

Mechanical test of the nanowire network were performed. In particular, tensile tests were performed with a Textechno Favimat tensile tester at a strain rate of 10%/min. Sample dimensions were determined from optical micrographs of each sample: widths and thickness of the nanowire network samples were 0.6 mm and 25 microns respectively. The volumetric density was then determined from areal density and thickness of the sample. Area density was determined by weighing a regular sample of network of nanowires, whose dimensions can be determined by direct observation through optical and/or electron microscopy techniques.

Discarding specimens that broke at the grips, 36 samples were tested in total, 23 at gauge length of 5 mm, 5 at 2 mm, and 8 at 1 mm. No significant difference in tensile strength was found at smaller gauge lengths. Data was corrected for machine compliance, obtained from tensile tests on commercial poly-aramid fibres. Stress-strain curves in the main manuscript are for 5 mm gauge-length samples. Tensile fracture energy values are showed on Table 1 below. Data showed on Table 1 were calculated from the 10 best measurements with clear evidence of a genuine fracture not induced by grips of defects introduced in the sample during manipulation. Density ratios were calculated assuming a maximum density corresponding to hexagonal closed packed bundles of solid rods each with the theoretical bulk density of the material. In particular, specific tensile strengths values are in MPa/SG units, wherein SG stands for specific gravity being numerically equivalent to the density of the network of nanowires in units of $g/cm^3$.

TABLE 1

| | Relative density d/dtheory | Density $(g/cm^3)$ | Fracture energy (J/g) | Strength (MPa/SG) | Fracture strain (%) |
|---|---|---|---|---|---|
| Si nanowire network | 0.061 | 0.128 | 0.18 ± 0.1 | 12.1 ± 3 | 2.75 ± 7 |

Figure 6:
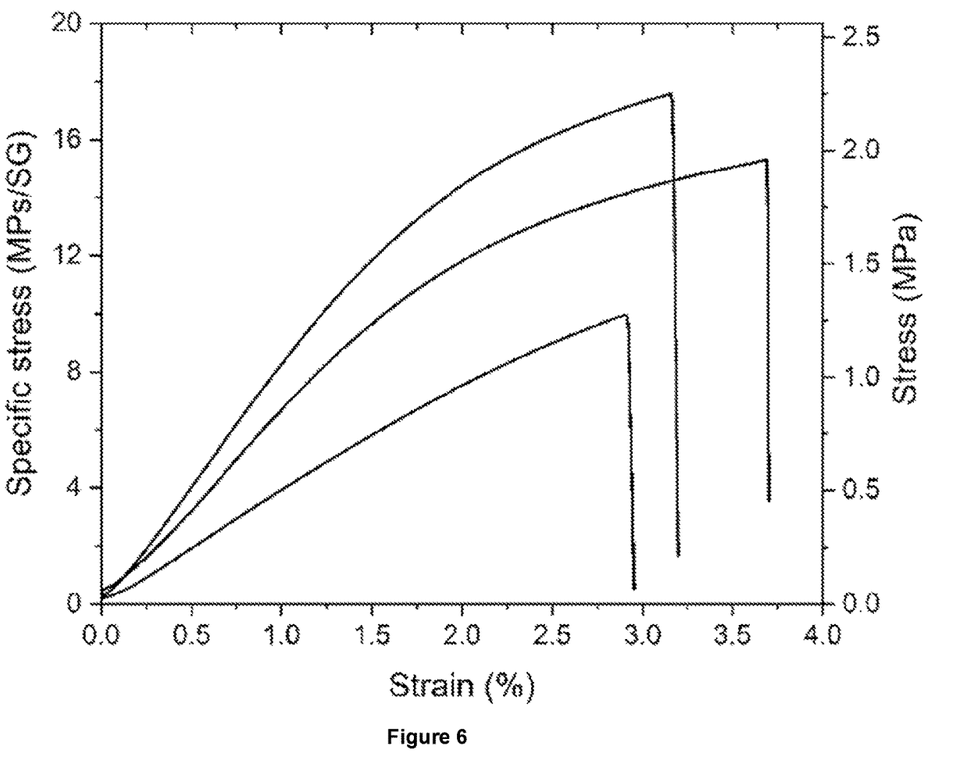
FIG. 6 shows mechanical tests results of nanowire networks.

FIG. 6 shows mechanical tests results on rectangular fabrics of samples comprising of Si nanowires. In particular, FIG. 6 shows a stress-strain curve for 5 mm gauge-length samples. The samples showed high fracture energy values from elasto-plastic deformation and correspondingly, high ductility. The nanowire network shows large ductility values of about 3%. In addition, the density-normalized fracture energy values were $0.18\pm0.1$ $Jg^{-1}$.

The invention claimed is:

1. A method for preparing a network of nanowires comprising the steps of:
   i. providing a first gas flow to a reaction vessel;
      wherein said first gas flow comprises at least one precursor compound comprising at least one element selected from Si, Ge, Al, Cu, Zn, Pt, Mo, W, Mn, and Li; wherein the at least one precursor compound is a metallic hydride or an organometallic compound; and
   ii. providing a second gas flow to the reaction vessel, said second gas flow comprising metallic catalyst particles; wherein the metallic catalyst particles consist of one element selected from Au, Ag, Cu, Fe, Ni, Ga, Co, Pt, In and Al; so as the first and second gas flows are mixed in the reaction vessel to form a gas flow mixture consisting of:
      the at least one precursor compound,
      at least a sheath gas selected from nitrogen, hydrogen and/or noble gases, and
      the metallic catalyst particles;
   wherein the precursor compound or the sum of precursor compounds is in the gas flow mixture in a mole fraction (xi) of between 0.006 and 0.50;
   wherein the temperature inside the reaction vessel ranges from 200 to 800° C. or is at least 801° C.; and
   wherein the at least one precursor compound decomposes under the temperature inside the reaction vessel and grows on the metallic catalyst particles by vapor liquid-solid (VLS) and/or chemical vapor deposition (CVD) to form a network of nanowires;
   wherein the nanowires of the network of nanowires are made of a solid material or are hollow.

2. The method according to claim 1, wherein the at least one precursor compound comprises one element selected from Si and Ge.

3. The method according to claim 1, wherein the at least one precursor compound is a metallic hydride.

4. The method according to claim 1, wherein the at least one precursor compound is selected from the group consisting of (3-Aminopropyl)triethoxysilane, N-sec-Butyl(trimethylsilyl)amine, chloropentamethyldisilane, tetramethylsilane, silicon tetrabromide, silicon tetrachloride, tris(tert-butoxy) silanol, $SiH_4$, tetramethylgermanium, triethylgermanium hydride, triphenylgermanium hydride, and tetramethylgermanium, tributylgermanium hydride.

5. The method according to claim 1, wherein the metallic catalyst particles consist of one element selected from Au, Ag, and Cu.

6. The method according to claim 1, wherein the metallic catalyst particles are gold particles.

7. The method according to claim 1, wherein the gas flow mixture comprises $H_2$.

8. The method according to claim 1, wherein the network of nanowires is generated at a rate of at least 0.01 g/h.

9. The method according to claim 1, wherein the temperature inside the reaction vessel ranges from 300 to 800° C. or from 801 to 3000° C.

10. A network of nanowires obtainable by the method according to claim 1, wherein the aspect ratio of the nanowires of the network of nanowires is at least 130; wherein the network of nanowires has a porosity between 60 and 97%; and wherein the nanowires of the network of nanowires comprise at least one material selected from AlN, $Al_zGa_x$ $In_{1-x-z}N$, Si, SiC, Ge, $Si_xGe_{1-x}$, $SiO_x$, $ZnO_x$, $MoS_y$, $WS_y$, $MoTe_y$, Pt, $CoO_x$, $MnO_x$, $Li_xMn_yO$, and $Li_xNi_yMn_zO$, where $0\leq x\geq1$, $0\leq y\geq1$ and $0\leq z\geq1$.

11. The network of nanowires according to claim 10, wherein the network of nanowires is self-standing.

12. The network of nanowires according to claim 10, wherein the average aspect ratio of the nanowires is at least 150.

13. The network of nanowires according to claim 10, wherein the average length of the nanowires is at least 1 micron.

14. The network of nanowires according to claim 10, wherein the nanowires comprise Si, SiC, Ge or $Si_xGe_{1-x}$ and $SiO_x$, where $0\leq x\geq1$.

15. The network of nanowires according to claim 10, wherein the nanowires form a net.

16. The network of nanowires according to claim 10, wherein the network has a volumetric density of at least $0.075$ $g/cm^3$, or fracture energy values of at least 0.05 J/g.

17. A nonwoven material comprising the network of nanowires as defined in claim 10.

18. An electrode or pharmaceutical composition comprising the network of nanowires according to claim 10.

19. A pharmaceutical composition or electrode comprising the network of nanowires according to claim 17.

* * * * *